United States Patent
Cash, Jr.

(10) Patent No.: US 6,361,333 B1
(45) Date of Patent: Mar. 26, 2002

(54) ELECTRICAL JUNCTION BOX

(76) Inventor: Ronald G. Cash, Jr., 12117 W. Cooper Dr., Littleton, CO (US) 80127

( * ) Notice: Subject to any disclaimer, the term of this patent is extended or adjusted under 35 U.S.C. 154(b) by 0 days.

(21) Appl. No.: 09/566,858

(22) Filed: May 8, 2000

(51) Int. Cl.[7] .......................... H01R 4/66; H01R 13/648
(52) U.S. Cl. ........................................ 439/106; 439/650
(58) Field of Search ................... 439/106, 76.2, 439/650, 658, 107, 216

(56) References Cited

U.S. PATENT DOCUMENTS

| | | | |
|---|---|---|---|
| 1,481,286 A | | 1/1924 | Wood |
| 2,700,752 A | * | 1/1955 | Cataldo ...................... 439/650 |
| 3,022,485 A | * | 2/1962 | Buchanan ................... 439/658 |
| 3,038,141 A | * | 6/1962 | Chiuchiolo ................. 439/650 |
| 3,500,130 A | | 3/1970 | Aument et al. |
| 3,510,822 A | * | 5/1970 | Patterson .................... 439/107 |
| 3,860,319 A | * | 1/1975 | Slater ......................... 439/400 |
| 4,245,880 A | | 1/1981 | Zimmerman et al. |
| 5,207,599 A | | 5/1993 | Chung ........................ 439/650 |
| 5,471,012 A | * | 11/1995 | Opel ........................... 174/53 |
| 5,595,491 A | * | 1/1997 | May ............................ 439/106 |
| 5,735,710 A | * | 4/1998 | Blaauboer et al. .......... 439/535 |
| 5,762,525 A | | 6/1998 | Candeloro ................... 439/660 |
| 5,848,915 A | | 12/1998 | Canizales .................... 439/650 |

FOREIGN PATENT DOCUMENTS

| | | |
|---|---|---|
| CH | 456715 | 3/1966 |
| FR | 968911 | 12/1950 |

* cited by examiner

Primary Examiner—Tulsidas Patel
Assistant Examiner—Hae Moon Hyeon
(74) Attorney, Agent, or Firm—Rader, Fishman & Grauer PLLC

(57) ABSTRACT

The present invention provides an improved electrical junction box wherein the electrical wires from a building's electrical system are terminated by connection to a set of terminal strips and lugs in a secure area of the junction box housing rather than directly on an electrical receptacle device that is mounted on and connected to the junction box housing. In accordance with the instant invention, an improved electrical junction box provides at least one set of plug-and-play electrical terminals into which electrical receptacle devices plug directly, without any need for additional hard wiring, stripping, pig tailing, or the like. In a preferred embodiment of the instant invention, all electrical wires terminate in a secure, non-confined area of the junction box, thereby reducing the hazard of electrical shock as well as the risk of electrical fire.

26 Claims, 3 Drawing Sheets

ELECTRICAL JUNCTION BOX

BACKGROUND OF THE INVENTION

1. Field of the Invention

The present invention relates to residential and commercial electrical wiring systems and devices; and, more particularly, to an improved electrical junction box for electrically connecting an electrical receptacle device to an electrical wiring system.

2. Description of Related Art

State and federal building codes require that when a building is wired to provide electrical power therein, the wiring must be installed between the exterior and interior wall surfaces, beneath the floors, above the ceilings, and between the surfaces of interior walls. The electrical wiring is installed after the framing of the building is completed but before the walls are erected on either side of the frame. Where ever electrical outlets, ceiling fixtures, wall switches, or the like are desired within the building, an electrical junction box, usually made of plastic or similar non-conductive material for interior use or metal for some exterior applications, is mounted on a frame member and then connected to the wiring. When wall surfaces, such as drywall or plaster, are later installed, access to the junction boxes is achieved through appropriate openings cut into the wall surface. Thus, standard residential and commercial electrical systems comprise a plurality of electrical junction boxes, each of which provides electrical conduit or sheathed cable for connecting the wires of electrical receptacle devices, such as electrical outlets, switches, fixtures, or the like to the electrical wiring of the building. While conventional electrical systems and junction boxes function adequately and relatively safely, they admit a variety of interrelated limitations. Conventional electrical wiring involves connecting the circuit at a junction box by terminating the stripped wires at the electrical receptacle device such as an outlet, switch, light fixture, hard wired appliance or the like. Therefore, in order to complete the proper, flush-mounted wall installation of any electrical receptacle device, all of the many wires and connectors associated with connecting the particular electrical receptacle device to the electrical system must first be connected electrically to the device and then the device with the attached wires is mounted onto the junction box. If the power is not shut off while the electrical receptacle device is being connected to the electrical system, the installer may receive an electrical shock during the installation, because the junction box contains a plurality of open wires and wire connections that are easily accessible and therefore readily mis-connected by the novice installer, such as the homeowner attempting to install a simple light fixture or ceiling fan without the aid of a skilled electrician. Moreover, because the wires are usually crammed into the junction box very tightly, the wires are capable of short-circuiting and causing dangerous electrical fires.

Standard electrical practices create additional limitations associated with the fact that current electrical systems only permit switch control of fixtures and/or outlets when the particular fixtures and/or outlets are directly wired to the same junction box as the switch. In an effort to circumvent this disadvantage, multiple gang junction boxes have been developed for terminating several switches in a single location and thereby permitting comparatively convenient control of multiple fixtures or groups of fixtures. Further, since a building's electrical circuits cannot be tested fully until after the walls of a building are erected, electrical connectivity errors or problems related to proper switch control of particular outlets and fixtures are frequent, especially in the case of multi-way switches, where more than one switch controls a single fixture or group of fixtures. These errors are costly and time-consuming to correct, as they require that the relevant portion of the interior wall surface be removed and reconstructed after the electrical error has been found and repaired.

It therefore would be advantageous to have an electrical junction box that permits convenient and simplified installation and removal of electrical receptacle devices in a plug and play manner. It would also be advantageous to have an electrical junction box wherein electrical wires from a building's electrical system terminate at a set of terminal strips and lugs in a secure area of the box rather than directly on an electrical receptacle device connected to the junction box. It would be further advantageous to have a junction box that provides a pair of plug-and-play terminals into which electrical receptacle devices are readily and conveniently plugged for connection to a building's electrical system. It would also be advantageous to have a junction box that provides a low voltage connector block adapted to provide for smart circuitry and a smart circuit communications path. It would also be advantageous to have a method for terminating and routing electrical wires such that full testing of the circuitry is possible prior to completion of the interior wall surfaces. It would also be advantageous to have a junction box that decreases the possibility of electrical shock. It would also be advantageous to have an electrical junction box that reduces the risk of electrical fire.

SUMMARY OF THE INVENTION

An electrical junction box now has been discovered that overcomes the above-described deficiencies of the prior art. The present invention provides an improved electrical junction box wherein the electrical wires from a building's electrical system terminate at connectors or lugs on a set of conductive terminal strips in a secure area of the junction box housing rather than directly on an electrical receptacle device that is mounted within and electrically connected to the junction box. In accordance with the instant invention, an improved electrical junction box provides at least one set of plug-and-play electrical termini into which electrical receptacle devices plug directly without any need for additional hard wiring, stripping, pig tailing, or the like. In a preferred embodiment of the instant invention, all electrical wires have a connection terminus on lugs conductively connected to terminal strips in a secure, non-confined area of the junction box, thereby eliminating the need to twist and pig tail bare wire and reducing the hazard of electrical shock as well as the risk of electrical fire. The housing can therefore also contain at least one set of low voltage cables for actuating and or monitoring the function of the junction box to provide a "smart circuit".

In accordance with the broad aspect of the invention, the improved electrical junction box comprises a housing which is adapted to be fastened or attached to a building structure. The housing contains at least two conductive terminal strips that are preferably located at the rear of the housing and are insulated one from the other by a non-conductive barrier. At least two terminal connecting lugs, which are attached in spaced apart relation along the conductive terminal strip, are in conductive communication with each conductive terminal strip. Preferably, the terminal connecting lugs on the conductive terminal strips provide termination points for the wire strands contained in a standard 600V sheathed cable. In another broad aspect, the housing contains at least one set of low voltage cables, which preferably terminates at a low voltage connector block, to provide monitoring and/ or controlling function to the junction box of the instant invention.

In accordance with the invention at least one outstanding female connector, conductively communicating with at least one conductive terminal strip, provides a plug-and-play electrical interface adapted to matingly and retentively engage a male connector on an electrical receptacle device which is adapted for electrically connecting an electrical appliance or fixture to the building electrical system through the junction box. The electrical receptacle device has at least one male connector for removably connecting and retaining the electrical receptacle device by retentive engagement of the male connector with the corresponding female connector. The electrical receptacle device can be an electrical receptacle unit, such as an electrical outlet, an electrical switch, a switched outlet, a controlling device, or the like. Alternatively, the electrical receptacle device can be an electrical receptacle adaptor in the case of an electrical appliance or fixture such as a light fixture, a ceiling fan, or the like. In the latter case, the electrical receptacle adaptor is hardwired to the electrical appliance or fixture, and the male connector (or connectors) on the electrical receptacle device is (are) removably inserted into the corresponding female connector (or connectors) on the conductive terminal strips within the junction box. Thus, when the male connectors of an electrical receptacle device are matingly and retentively engaged with or inserted into the corresponding female connectors, the male connectors are conductively connected to the conductive terminal strips in the junction box housing, which thereby electrically connects the electrical receptacle device to a building's electrical power supply.

The junction box housing preferably is made from non-conductive material to which the conductive terminal strips are attached. The housing also can be made from conductive material, such as metal, which contains an insulating film or barrier along the rearward interior thereof to insulate the conductive terminal strips from the conductive housing.

In a preferred embodiment, the electrical junction box houses a set of at least three conductive terminal strips, including at least one electrically positive conductive terminal strip, at least one electrically negative conductive terminal strip, and at least one electrically neutral conductive terminal strip. In this preferred aspect, the junction box also has a corresponding set of at least three female connectors substantially aligned with each other and extending outwardly from the corresponding conductive terminal strips and adapted to removably, matingly, retentively, and conductively engage a corresponding set of at least three male connectors on an electrical receptacle device.

In another embodiment, the male connector on the electrical receptacle device is a single, medially insulated prong having a first side that is electrically positive and a second side that is electrically negative. In this embodiment, the single, medially insulated prong is removably, matingly, retentively, and conductively engaged with or inserted into a corresponding, medially insulated, female connector having a first side in conductive communication with an electrically positive conductive terminal strip and a second side in conductive communication with an electrically negative conductive terminal strip. The first and second sides or conductive portions of the medially insulated female connector are separated by and proximate to the medial insulative barrier. Thus, a single female connector engages a single male connector, each of which carries both the positive side and the negative side of the circuit.

In another embodiment, the electrical receptacle device has two male connectors, wherein one of the male connectors or prongs is electrically negative, and the other male connector or prong is electrically positive. In this embodiment, the two male connectors are removably, matingly, retentively, and conductively engaged with or inserted into a corresponding set of two female connectors which conductively communicate with two corresponding conductive terminal strips. One of the conductive terminal strips is electrically positive, and the other conductive terminal strip is electrically negative.

In a preferred embodiment, a security plate having apertures substantially corresponding to the female connectors fits over the female connectors for removable attachment within the interior of the housing to provide a secure, substantially enclosed environment within the rear portion of the junction box. Thus, all open electrical contacts within the junction box are separated from the remaining portion of the electrical junction box.

In accordance with another aspect of the invention, the housing contains at least one set of low voltage cables which preferably passes through the housing and terminates at a low voltage connector block. Preferably, the low voltage cables comprise two matched sets of cabling, one for control of the circuit and the second for monitoring activity therein. The low voltage connector block is adapted to receive a control/monitor pigtail from an electrical receptacle device mounted on and electrically and/or conductively connected to the electrical junction box, thereby facilitating a smart circuit communications path. When a control or monitor capable electrical receptacle device having a control/monitor pigtail is removably inserted into the junction box, the control/monitor pigtail removably interfaces with the low voltage connector block such that a "smart circuit" is capable of completion. In accordance with this embodiment, the housing is preferably partitioned to separate the low voltage cable and/or the low voltage connector block from the other components of the junction box. Preferably, the partition is a non-conductive, low voltage barrier. In a preferred aspect, the at least one set of low voltage cables is two sets of low voltage cables; a first set communicates data and information to the low voltage connector block and a second set is used for controlling and monitoring the electrical receptacle device or devices electrically and/or conductively connected to the junction box. In another preferred embodiment, the low voltage connector block is enclosed behind the above-described security plate and is therefore contained within a rearward side portion of the junction box. In this preferred aspect, the security plate further comprises at least one aperture that substantially corresponds to at least one aperture on the low voltage connector block that is adapted to receive the control/monitor pigtail. Thus, when the security plate encloses the low voltage connector block in a rearward side portion of the junction box housing, the control/monitor pigtail can removably and matingly engage the low voltage connector block through the security plate.

In accordance with the invention, a plurality of electrical junction boxes, each electrically connected to particular electrical receptacle devices, can be wired in series. The present invention provides for identical wiring of all electrical receptacle devices capable of being connected to the improved junction box regardless of the type of electrical receptacle device. Each electrical device or unit includes an identically wired electrical receptacle device having at least one male connector which is matingly engaged with or plugged into a corresponding female connector within an electrical junction box. In a preferred embodiment, each junction box is then wired in series with other similar junction boxes, providing for up to eight non-switch electrical receptacle devices on a single circuit. In a preferred embodiment, when the electrical junction boxes are wired in series, standard 600V sheathed cable enters the junction box through an end panel of the housing, connects to the conductive terminal strips by means of spaced apart lugs, and exits the junction box through an opposing end panel of the housing for continuation of the electrical circuit and connection to the next junction box in the series. Similarly, in another preferred embodiment, the low voltage cables enter the junction box through an end panel of the housing, connect to the low voltage connector block, and exit the junction box through an opposing end panel of the housing for continuation of the smart circuit and connection to the next junction box in the series.

Other objects, features, and advantages of the present invention will become apparent to those skilled in the art from the following detailed description. It should be understood, however, that the detailed description and specific examples, while indicating preferred embodiments of the present invention, are given for purposes of illustration and not of limitation. Many changes and modifications within the scope of the present invention may be made without departing from the spirit thereof, and the invention includes all such modifications.

BRIEF DESCRIPTION OF PREFERRED EMBODIMENTS

The above and further objects of the invention will become more readily apparent as the invention is more fully understood from the detailed description to follow, with reference being made to the accompanying drawings in which like reference numerals represent like parts throughout and in which.

DETAILED DESCRIPTION OF PREFERRED EMBODIMENTS

Figure 1:
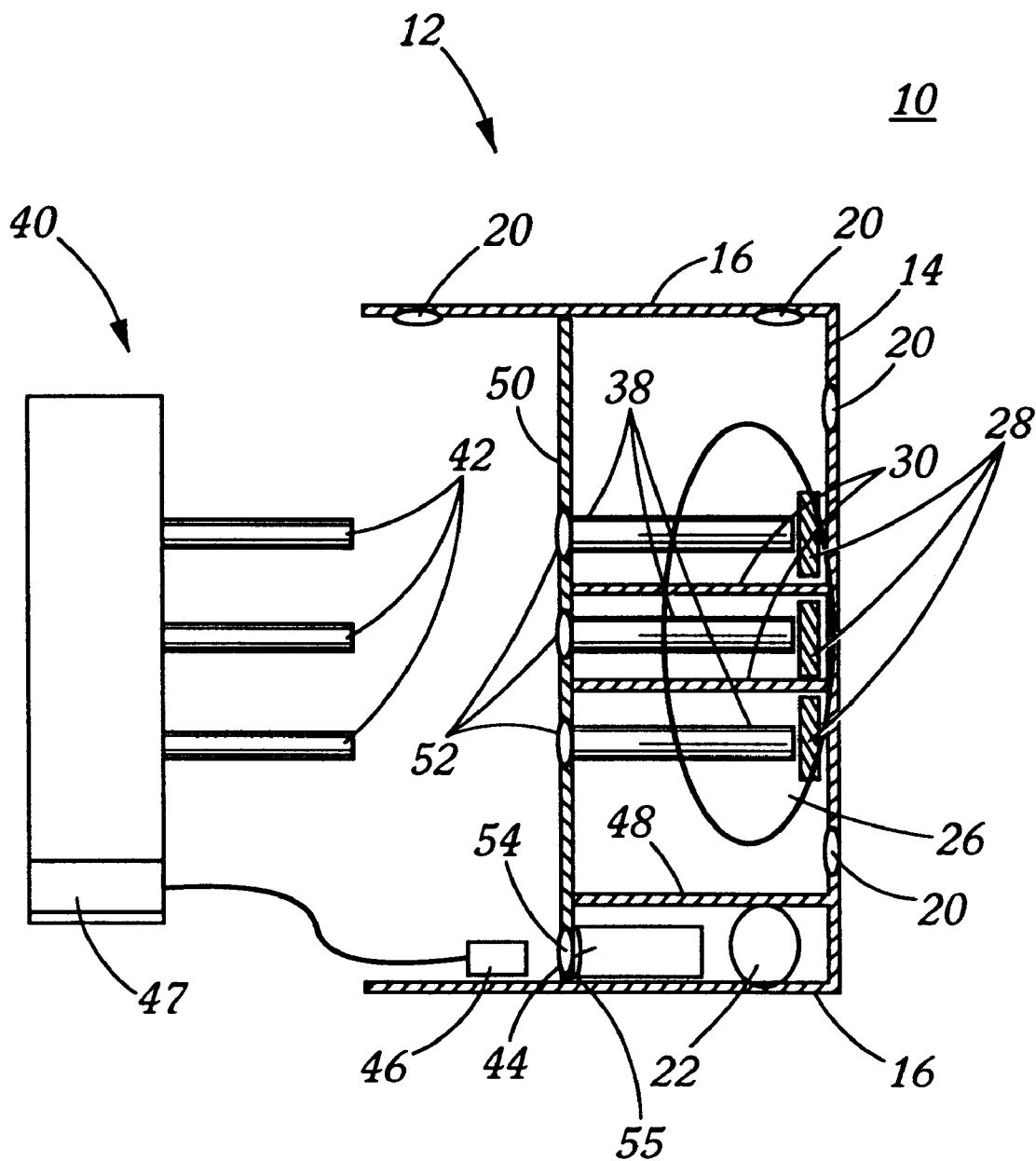
FIG. 1 is a cross-sectional top view of the electrical junction box of the instant invention.
Figure 2:
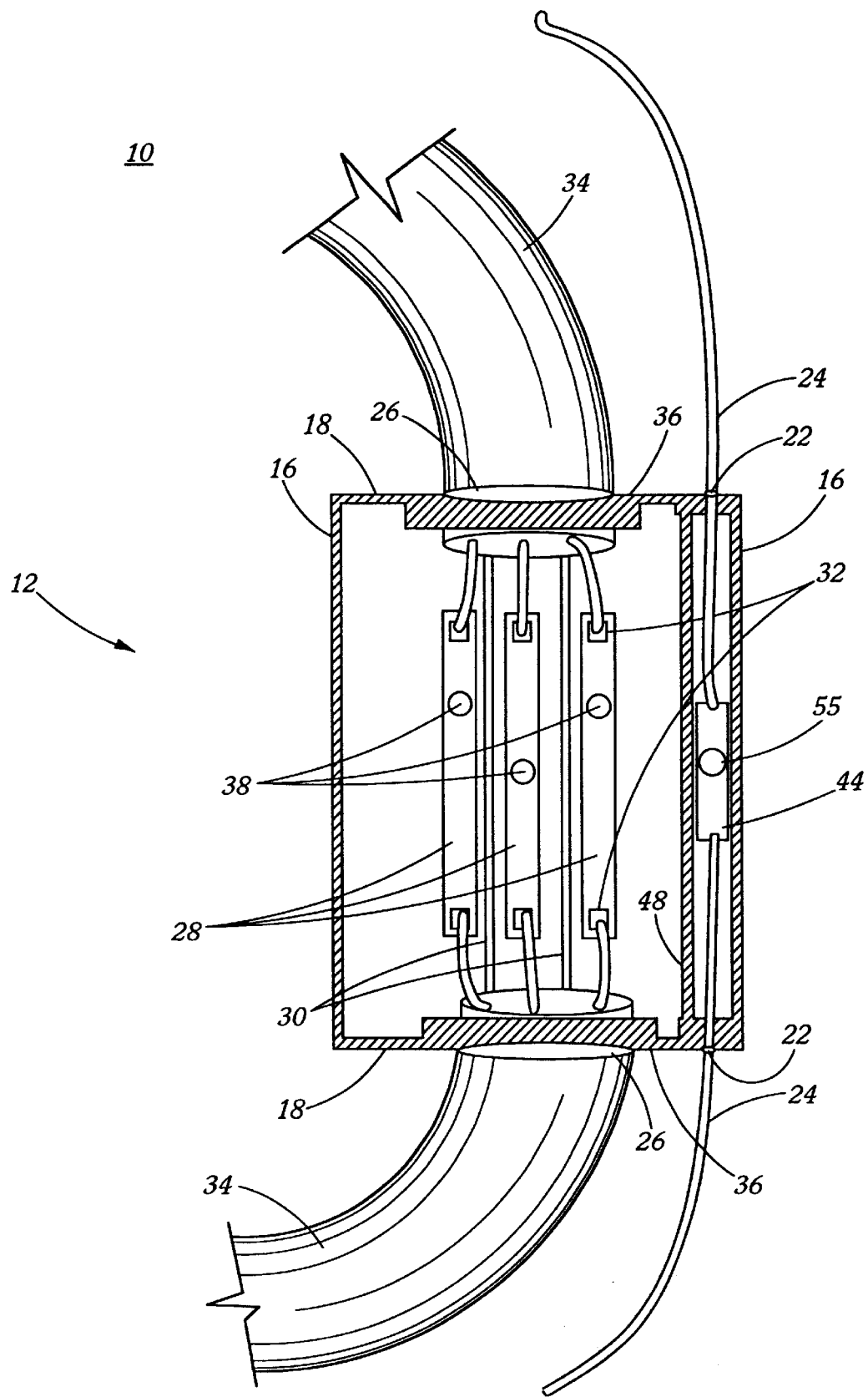
FIG. 2 is a frontal view of the electrical junction box of the instant invention without a security plate.

Turning now to FIGS. 1 and 2, the overall structure of the improved electrical junction box 10 is illustrated. As shown in the cross-sectional top view of FIG. 1, the improved electrical junction box 10 comprises a housing or box member 12 which further comprises a rear panel 14 which can be square, rectangular, or any other suitable shape. A spaced, substantially parallel, opposed pair of side panels 16 extends outward from and substantially perpendicular to said rear panel 14, and a spaced, substantially parallel, opposed pair of end panels 18 (shown in FIG. 2) extends outward from and substantially perpendicular to said rear panel 14 and bridges said side panels 16 to provide a partially enclosed space there between. There is at least one aperture or hole 20 in the rear panel 14 and/or in the side panels 16 adapted to receive fastener means for mounting the junction box 10 to a suitable surface of a building structure, such as a framing member or framing stud. These apertures may be formed through the rear panel 14 and/or the side panels 16 or may be formed as key hole tabs that extend from the peripheral edges of the rear panel 14 and/or the side panels 16. In a preferred aspect, at least one electrical wire or cable aperture or opening 22 (FIG. 2) is formed through each of the end panels 18, preferably disposed toward the rear panel 14 and near or along one side of the housing or box member 12, and adapted to receive electrical wires or cables, such as, for example, low voltage cable 24. As better seen in FIG. 2, cable is led into and exits the junction box 10 at cable entry/exit apertures 26 which are disposed toward the center of both end panels 18 of the box member 12.

The housing 12 of the electrical junction box 10 can be made of plastic or any other suitable, non-conductive material. As used in various commercial applications, the housing 12 also can be made of metal, can be fastened to the external surface of a wall or building structure, and can have electrical conduit enter and run through the housing 12. The fastener means for mounting the junction box to a building surface structure are preferably screws but can be any suitable fastener known and practiced by one of ordinary skill in the art.

The housing 12 of the instant junction box 10 contains a set of three conductive terminal strips 28 that are insulated one from the other by a non-conductive barrier 30. The non-conductive barrier 30 can be made of plastic or any other suitable material as known and practiced in the art. As better seen in FIG. 2, each conductive terminal strip 28 further comprises a pair of terminal connecting lugs 32 fixedly attached in spaced apart relation along the conductive terminal strip 28, which provides for the termination of standard 600V sheathed cable 34. Wire clamp means 36 adjacent the cable entry apertures 26 are fixedly attached to the end panels 18 for insuring that the standard 600V sheathed cable 34 is not inadvertently pulled out of the electrical junction box 10. As shown in FIG. 1, a set of three female connectors 38 provides a plug-and-play type interface to connect electrical receptacle device 40 to the conductive terminal strips 28 via male connectors 42. The electrical receptacle device 40 has a set of three male connectors 42 for removably inserting the electrical receptacle device 40 into the corresponding female connectors 38. The electrical receptacle device 40 can be, for example, an electrical outlet, an electrical switch, a switched electrical outlet, an electrical receptacle adaptor, or the like.

As illustrated in FIG. 2, in a preferred aspect of the instant electrical junction box 10, low voltage cable 24 enters the junction box 10 through electrical cable aperture 22 in end panel 18, terminates into low voltage connector block 44, and exits through cable aperture 22 in the opposing end panel 18 to provide a smart circuit communications path. As better seen in FIG. 1, if electrical receptacle device 40 is control or monitor capable, low voltage connector block 44 is adapted to interface removably with or removably receive a control/monitor pigtail 46 on electrical receptacle device 40 to complete a smart circuit through low voltage cable 24 (shown in FIG. 2). As better shown in FIG. 2, a non-conductive low voltage barrier 48 separates the low voltage connector block 44 from the other components in the remainder of the junction box 10, thereby separating all standard voltage cables 34 connected to the conductive terminal strips 28 from the low voltage cable 24 connected to the low voltage connector block 44. The non-conductive low voltage barrier 48 can be made of plastic or any other suitable material as known and practiced by one of ordinary skill in the art. A security plate 50 (shown in FIG. 1), having apertures 52 corresponding to the female connectors 38 and aperture 54 corresponding to an aperture or opening 55 in low voltage connector block 44, fits into the housing 12. The security plate 50 fits over, or in front of, the female connectors 38 and the low voltage connector block 44 and removably attaches to the side panels 16 and end panels 18 of the housing 12 to provide a secure, enclosed environment within the rear portion of the junction box 10 which thereby contains all open electrical contacts. The security plate 50 can be of any suitable non-conductive material or, in the case of a metal junction box, can be of suitably insulated conductive material, such as metal.

Figure 3:
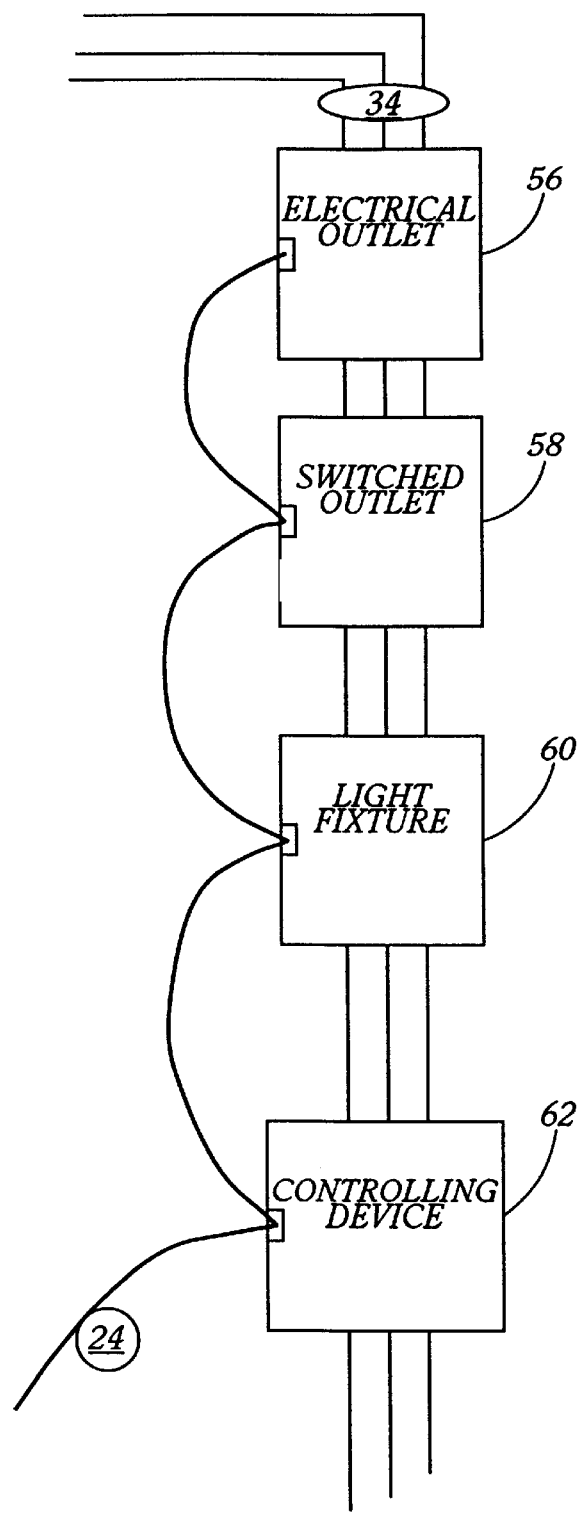
FIG. 3 is a high-level connectivity diagram showing a plurality of electrical junction boxes wired in series.

Referring next to FIG. 3, a high-level connectivity diagram shows a plurality of electrical receptacle devices wired in series. The instant electrical junction box provides that all electrical receptacle devices are similarly wired and are therefore capable of being inserted or plugged into the junction box, regardless of the type of electrical receptacle device. In a preferred embodiment, each identically wired electrical receptacle device is removably inserted or plugged into its respective junction box, which is wired in series and connected to up to eight non-switch electrical receptacle devices on a single circuit. As described above with reference to FIGS. 1 and 2, in this preferred embodiment, when a plurality of electrical junction boxes are wired in series, standard 600V sheathed cable 34 enters the junction box 10 through an end panel 18 of the housing 12, connects to the conductive terminal strips 28, and exits the junction box 10 through an opposing end panel 18 of the housing 12 for continuation of the electrical circuit and connection to the next junction box 10 in the series. In another preferred aspect, as described above with reference to FIGS. 1 and 2, low voltage cable 24 enters the junction box 10 through an end panel 18 of the housing 12, connects to the low voltage connector block 44, and exits the junction box 10 through the opposing end panel 18 of the housing 12 for continuation of the smart circuit and connection to the next junction box in the series.

As shown schematically in FIG. 3, examples of the variety of electrical receptacle devices that can be connected to the junction box and wires in series include a standard electrical outlet 56; a switched outlet 58; a light fixture 60; and a controlling device 62, such as for example a touch pad that is programmed to control both light fixture 60 and switched outlet 58 individually, or an electrical switch that is specifically programmed to control switched outlet 58. The standard voltage cable 34 passes through each electrical junction box in series, thereby providing electrical power to all of the electrical receptacle devices 56, 58, 60, and 62 on the circuit. Specific control of the electrical power provided to each electrical receptacle device, such as whether the electrical receptacle device is turned on or off, is managed by each electrical receptacle device individually. If an electrical receptacle device is a controllable device, such as for example on a switched outlet 58 or a light fixture 60, input from controlling device 62 is required to change the state (i.e., on/off) of the controllable switched outlet 58 or light fixture 60. Controlling device 62 is not hardwired to the electrical receptacle device that it controls, and control is independent of whether or not the electrical receptacle device being controlled is connected to a completed electrical circuit.

Although the present invention has been described with reference to preferred embodiments, including particular materials and size parameters, those skilled in the art will recognize that various modifications and variations to the same can be accomplished without departing from the spirit and scope of the present invention and that such modifications are clearly contemplated herein. No limitation with respect to the specific embodiments disclosed herein is intended nor should any be inferred.

What is claimed is:
1. An electrical junction box comprising:
 a. a housing having means for fastening said housing to a building structure and having a rearward portion for retaining conductively terminal strips and a remaining portion;
 b. at least two conductive terminal strips insulatably attached to said housing, wherein each conductive terminal strip has means for securely, conductively terminating an electrical cable, wherein each of said at least two conductive terminal strips is insulated one from the other, and wherein said at least two conductive strips are insulated from said remaining portion of said housing;
 c. at least one female connector in conductive communication with at least one conductive terminal strip for matingly and retentively engaging a corresponding male connector; and,
 d. an electrical receptacle device having at least one male connector to conductively connect said electrical receptacle device by matingly and retentively engaging a corresponding female connector.

2. The electrical junction box of claim 1 wherein said at least two conductive terminal strips each have at least two terminal connecting lugs for conductively terminating said electrical cable, and wherein said at least two terminal connecting lugs are conductively connected in spaced apart relation along said conductive terminal strip.

3. The electrical junction box of claim 1 wherein each of said at least two conductive terminal strips is insulated one from the other by a nonconductive barrier.

4. The electrical junction box of claim 1 wherein said at least one male connector comprises one electrically negative male connector and one electrically positive male connector, and wherein each of said male connectors removably, matingly, and retentively engages a corresponding female connector which conductively communicates with a corresponding conductive terminal strip, and wherein one of said corresponding conductive terminal strips is electrically negative and the other is electrically positive.

5. The electrical junction box of claim 1 wherein said at least one male connector comprises one electrically negative male connector, one electrically positive male connector, and one electrically neutral male connector, and wherein each of said male connectors removably, matingly, and retentively engages a corresponding female connector which conductively communicates with a corresponding conductive terminal strip, and wherein one of said corresponding conductive terminal strips is electrically positive, one is electrically negative, and one is electrically neutral.

6. An electrical junction box comprising:
 a. a housing having means for fastening said housing to a building structure;
 b. at least two conductive terminal strips insulatably attached to said housing, wherein each conductive terminal strip has means for conductively terminating an electrical cable, and wherein each of said at least two conductive terminal strips is insulated one from the other;
 c. at least one female connector in conductive communication with at least one conductive terminal strip for matingly and retentively engaging a corresponding male connector; and,
 d. an electrical receptacle device having at least one male connector to conductively connect said electrical receptacle device by matingly and retentively engaging a corresponding female connector wherein said electrical junction box terminates at least one set of low voltage cables for monitoring and/or controlling said electrical junction box.

7. The electrical junction box electrical junction box of claim 6 wherein said housing is partitioned by a non-conductive, low voltage barrier to separate said at least one set of low voltage cables from other components of said junction box.

8. The electrical junction box of claim 6 further comprising a low voltage connector block attached to said housing and adapted to terminate said at least one set of low voltage cables.

9. The electrical junction box of claim 8 wherein said low voltage connector block further is adapted to receive a control/monitor pigtail from an electrical receptacle device mounted on and electrically connected to said electrical junction box.

10. The electrical junction box of claim 6 wherein said electrical junction box is adapted to terminate at least two sets of low voltage cable.

11. The electrical junction box of claim 10 wherein said at least two sets of low voltage cable comprise a first set of low voltage cables for communicating data and information to said low voltage connector block and a second set of low voltage cables for controlling and monitoring at least one electrical receptacle device conductively connected to said junction box.

12. The electrical junction box of claim 1 wherein said electrical junction box further comprises a security plate, having at least one aperture substantially corresponding to said at least one female connector, removably attached within said housing such that said security plate substantially encloses said at least two conductive terminal strips and said at least one female connector within said housing.

13. The electrical junction box of claim 12 wherein said security plate further comprises at least one aperture substantially corresponding to at least one aperture on a low voltage connector block that is adapted to receive a control/monitor pigtail, and wherein said security plate encloses said low voltage connector block within said housing and permits said control/monitor pigtail to removably and matingly engage said low voltage connector block through said security plate.

14. The electrical junction box of claim 1 wherein said electrical receptacle device is selected from the group consisting of an electrical outlet, a switched electrical outlet, an electrical switch, and an electrical receptacle adaptor.

15. An electrical junction box comprising:
  a. a housing comprising;
    i. a rear panel including at least one mounting aperture adapted to receive fastener means for mounting said junction box to a building surface structure;
    ii. a spaced, substantially parallel, opposed pair of side panels extending outward from and substantially perpendicular to said rear panel;
    iii. a spaced, substantially parallel, opposed pair of end panels extending outward from and substantially perpendicular to said rear panel and bridging said side panels to provide a partially enclosed space there between; and
    iv. at least one cable entry aperture formed through said end panels;
  b. at least two conductive terminal strips insulatably attached to said rear panel of said housing, wherein each conductive terminal strip has at least two terminal connecting lugs attached in spaced apart relation along said conductive terminal strip for terminating electrical cables, and wherein each of said conductive terminal strips is insulated one from the other by a non-conductive barrier
  c. at least one female connector in conductive communication with at least one conductive terminal strip and adapted to matingly and retentively engage a corresponding male connector therein;
  d. an electrical receptacle device having at least one male connector adapted to conductively connect said electrical receptacle device to said electrical junction box by matingly and retentively engaging a corresponding female connector; and
  e. at least one set of low voltage cables terminating at a low voltage connecter box in said electrical junction box for monitoring and/or controlling said electrical junction box.

16. The electrical junction box of claim 15 wherein said electrical junction box further comprises a security plate, having at least one aperture substantially corresponding to said at least one female connector, removably attached within said housing such that said security plate is positioned substantially parallel to said rear panel and substantially perpendicular to said side panels and end panels and thereby substantially encloses said at least two conductive terminal strips and said at least one female connector within a rear portion of said housing.

17. The electrical junction box of claim 15 wherein said electrical receptacle device is selected from the group consisting of an electrical outlet, a switched electrical outlet, an electrical switch, and an electrical receptacle adaptor.

18. The electrical junction box of claim 15 wherein said at least one male connector is a single, medially insulated prong having a first side that is electrically positive and a second side that is electrically negative, and wherein the single, medially insulated prong removably, matingly, and retentively engages a corresponding medially insulated female connector having a first side in conductive communication with an electrically positive conductive terminal strip and a second side in conductive communication with an electrically negative conductive terminal strip.

19. The electrical junction box of claim 15 wherein said at least one male connector comprises one electrically negative male connector and one electrically positive male connector, and wherein each of said male connectors removably, matingly, and retentively engages a corresponding female connector which conductively communicates with a corresponding conductive terminal strip, and wherein one of said corresponding conductive terminal strips is electrically negative and the other is electrically positive.

20. The electrical junction box of claim 15 wherein said at least one male connector comprises one electrically negative male connector, one electrically positive male connector, and one electrically neutral male connector, and wherein each of said male connectors removably, matingly, and retentively engages a corresponding female connector which conductively communicates with a corresponding conductive terminal strip, and wherein one of said corresponding conductive terminal strips is electrically positive, one is electrically negative, and one is electrically neutral.

21. The electrical junction box of claim 15 wherein said housing is partitioned by a non-conductive, lowvoltage barrier to separate said at least one set of low voltage cables from other components of said junction box.

22. The electrical junction box of claim 15 further comprising a low voltage connector block attached to said housing and adapted to terminate said at least one set of low voltage cables.

23. The electrical junction box of claim 22 wherein said low voltage connector block further is adapted to receive a control/monitor pigtail from an electrical receptacle device mounted on and electrically connected to said electrical junction box.

24. The electrical junction box of claim 16 wherein said security plate further comprises at least one aperture substantially corresponding to at least one aperture on a low voltage connector block that is adapted to receive a control/monitor pigtail, and wherein said security plate encloses said low voltage connector block within said housing and permits said control/monitor pigtail to removably and matingly engage said low voltage connector block through said security plate.

25. The electrical junction box of claim 15 wherein said junction box is adapted to terminate at least two sets of low voltage cable.

26. The electrical junction box of claim 24 wherein said at least two sets of low voltage cable comprise a first set of low voltage cables for communicating data and information to said low voltage connector block and a second set of low voltage cables for controlling and monitoring at least one electrical receptacle device conductively connected to said junction box.

* * * * *